(12) United States Patent
Weissman et al.

(10) Patent No.: US 6,505,275 B1
(45) Date of Patent: Jan. 7, 2003

(54) METHOD FOR SCALABLE MEMORY EFFICIENT THREAD-LOCAL OBJECT ALLOCATION

(75) Inventors: Boris Weissman, Mountain View, CA (US); Sreeram Duvvuru, Fremont, CA (US); Benedict Gomes, Mountain View, CA (US)

(73) Assignee: Sun Microsystems, Inc., CA (US)

( * ) Notice: Subject to any disclaimer, the term of this patent is extended or adjusted under 35 U.S.C. 154(b) by 92 days.

(21) Appl. No.: 09/624,173

(22) Filed: Jul. 24, 2000

(51) Int. Cl.[7] .............................................. G06F 12/00
(52) U.S. Cl. ...................... 711/154; 711/100; 711/165; 711/170
(58) Field of Search ................................. 711/100, 111, 711/154, 152, 163, 165, 170

(56) References Cited

U.S. PATENT DOCUMENTS

| | | | | |
|---|---|---|---|---|
| 6,081,665 A | * | 6/2000 | Nilsen et al. | 395/705 |
| 6,173,442 B1 | * | 1/2001 | Agesen et al. | 717/5 |
| 6,314,563 B1 | * | 11/2001 | Agesen et al. | 717/9 |
| 6,317,816 B1 | * | 11/2001 | Loen | 711/171 |
| 6,349,312 B1 | * | 2/2002 | Fresko et al. | 707/205 |

FOREIGN PATENT DOCUMENTS

EP        0969379 A2    1/2000
WO    WO 00/05652       2/2000

OTHER PUBLICATIONS

International Search Report (7 pages), dated Jul. 16, 2002.
"Optimizing Dynamic Memory Management in a Multi-threaded Application Executing on a Multiprocessor," by Daniel Haggander and Lars Lundberg, 1998 IEEE, pp. 262–269.

* cited by examiner

Primary Examiner—Tuan V. Thai
(74) Attorney, Agent, or Firm—Rosenthal & Osha L.L.P.

(57) ABSTRACT

A memory allocation scheme for object allocation in concurrent object-oriented server-side environments that combines the time efficiency of thread-local allocation schemes with the space efficiency of shared-heap allocation schemes has been developed. A pool of memory allocation spaces is maintained so that when a thread transitions to a runnable state, it is allocated a private memory space. However, when the thread transitions out of the runnable state and no longer needs its allocated memory, the space is re-allocated back to the pool for use by another runnable state thread.

13 Claims, 2 Drawing Sheets

METHOD FOR SCALABLE MEMORY EFFICIENT THREAD-LOCAL OBJECT ALLOCATION

BACKGROUND OF THE INVENTION

1. Field of Invention

The invention relates to a method of computer memory allocation and more particularly to a scalable method of thread-local object allocation.

2. Background

Memory allocation in concurrent object-oriented programming languages (e.g., Java) and concurrent extensions of sequential programming languages (e.g., C) are traditionally accomplished by either a "shared-heap" allocation scheme or a "thread-local" allocation scheme. Each has its own distinct advantages and disadvantages.

The shared-heap scheme of memory allocation maintains a general area from which memory is assigned is commonly called the heap. It is a controlled area for the storage of unallocated memory. As the name implies, the heap is shared among the threads. The heap is guarded by mutual exclusion primitives. This is an operation that allows only one thread, or logical unit of application, access to the memory at a time. Mutual exclusion primitives are necessary to ensure stable operations since the heap is a shared resource.

The shared-heap allocation scheme has several adverse impacts on performance, especially in multi-processor applications such as servers. In particular, multi-processor performance or scalability is hurt by needless serialization. Serialization is the requirement that potentially concurrent operations be executed consecutively. Another problem is bus traffic due to cache misses. A cache miss occurs when the hardware cache finds that the data sought is not present and the data must be accessed from the hard disk drive instead. These cache misses are most commonly caused by atomic memory operations and false sharing. A final problem with shared-heap allocation is simply the extra cycles for instructions required by mutual exclusion.

Prior art Java environments (e.g., Sun Microsystems' Hotspot Performance Engine) focus on optimizing the mutual exclusion mechanisms. While these efforts improve allocation efficiency by reducing the total instruction count, they ignore multi-processor scalability issues. These issues include reduction in bus traffic and co-location of objects in working sets of individual threads.

The thread-local allocation scheme of memory allocation views each allocated memory space as a private thread resource. Because each thread has its own specified memory allocation space or "heaplet", mutual exclusion is guaranteed. As a result, "cache sloshing" is reduced. This sloshing occurs when the value in a cache register rapidly migrates among different caches in a multi-processor environment. Additionally, "locality" is improved. This is where objects created by the same thread near the same time are located near the same space.

However, the thread-local scheme cannot be used in highly concurrent multi-processor applications without significant difficulties. This scheme makes very high demands on memory allocation space size. For example, an application that creates one thousand threads with 1 Mb memory space allocated per thread would need 1 Gb of space for the entire memory pool. Also, memory fragmentation and frequent "garbage collections" are substantial problems. Garbage collection or GC is the creation and resizing of allocation spaces. It is an automatic function of the processor that frees the programmer from explicitly performing these tasks. Common GC implementations require all threads to be stopped (known as "stopping the world") before proceeding. The increased number private heaplets will have a corresponding increase in the time that all threads are stopped.

SUMMARY OF INVENTION

In some aspects the invention relates to a method for allocating memory comprising: maintaining a memory pool comprising a plurality of memory spaces; allocating a memory space to a thread when the thread transitions to runnable state; and allocating the memory space to the memory pool when the thread transitions to a blocked state.

In an alternative embodiment, the invention relates to an apparatus for allocating memory comprising: a microprocessor; and a program executable on the microprocessor that maintains a memory pool comprising a plurality of memory spaces, allocates a memory space to a thread when the thread transitions to runnable state, and allocates the memory space to the memory pool when the thread transitions to a blocked state.

In an alternative embodiment, the invention relates to an apparatus for allocating memory comprising: means for maintaining a plurality of memory spaces; means for allocating a memory space to a thread when the thread transitions to runnable state, and means for de-allocating the memory space to a thread when the thread transitions to a blocked state.

The advantages of the invention include, at least: reduced demands on memory pool allocation space; decreased memory fragmentation; and decreased frequency of garbage collection operations. These advantages result in faster and more stable operations, especially in highly concurrent operations in multi-processor environments.

DETAILED DESCRIPTION OF THE INVENTION

Figure 1:
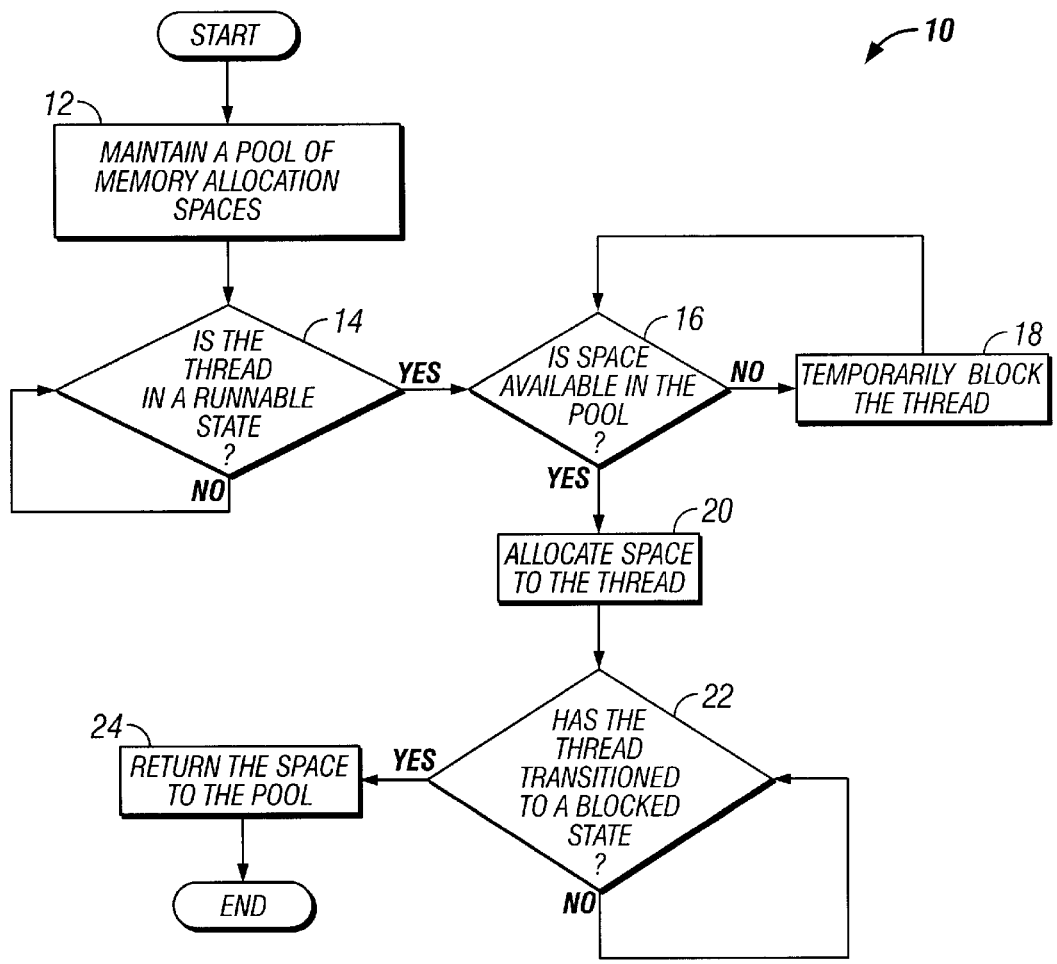
FIG. 1 shows a flow chart representing one embodiment of the present invention.

Exemplary embodiments of the invention will be described with reference to the accompanying drawings. Like items in the drawings are shown with the same reference numbers.

In many applications, at any given time the overwhelming majority of threads are in blocked states that render object allocation impossible. For example, in many server-side benchmark applications only an average of 3–8% of the total threads are in a runnable state at any one time. If a matching number of allocation spaces could be maintained, the benefits of thread-local allocation could be achieved while substantially reducing the allocation area requirements as well as memory fragmentation.

FIG. 1 shows a flow chart (step 10) representing one embodiment of the present invention. First, a pool of memory spaces is maintained (step 12) by the system. When a thread makes a transition to a runnable state (step 14) and sufficient memory space is available in the memory pool to support that thread (step 16), a private memory space is allocated to the thread (step 20). Should there be insufficient space in the memory pool to support the thread, the thread is temporarily transitioned to a blocked state (step 18). The thread will remain in this stopped state until sufficient memory becomes available in the pool. Once this happens, the thread transitions back to its runnable state and is allocated a memory space. The memory space is allocated to the each thread on a non-permanent basis. When the thread with the allocated memory space transitions to a blocked state (step 22), the allocated memory space is returned to the memory pool (step 24) where it is available for allocation to another thread in a runnable state. The transition to a blocked state could result from synchronization, waiting on an I/O, etc.

The embodiment shown in FIG. 1 represents a memory allocation method that combines the benefits of thread-local allocation with the memory efficiency of the shared-heap allocation method. Just as in simple thread-local allocation, each executing thread maintains its own allocation space and performs lock-free allocation of objects. However, the private allocated memory spaces are not permanently bound to the threads. While any runnable thread always has its private allocation space, the association between the two may change over the thread's lifetime. The threads that are in states that prevent them from creating a new object (e.g., waiting on a resource) do not need their private allocation spaces. These blocked state threads release the allocated spaces back to the memory pool for use by runnable state threads.

On occasion, there is insufficient space available in the memory pool for allocation to a runnable state thread. In such an instance, the thread is temporarily transitioned to a blocked state until space is made available. This available space may come from two sources: a released allocation space from a thread in a non-runnable state; or a garbage collection procedure.

Figure 2:
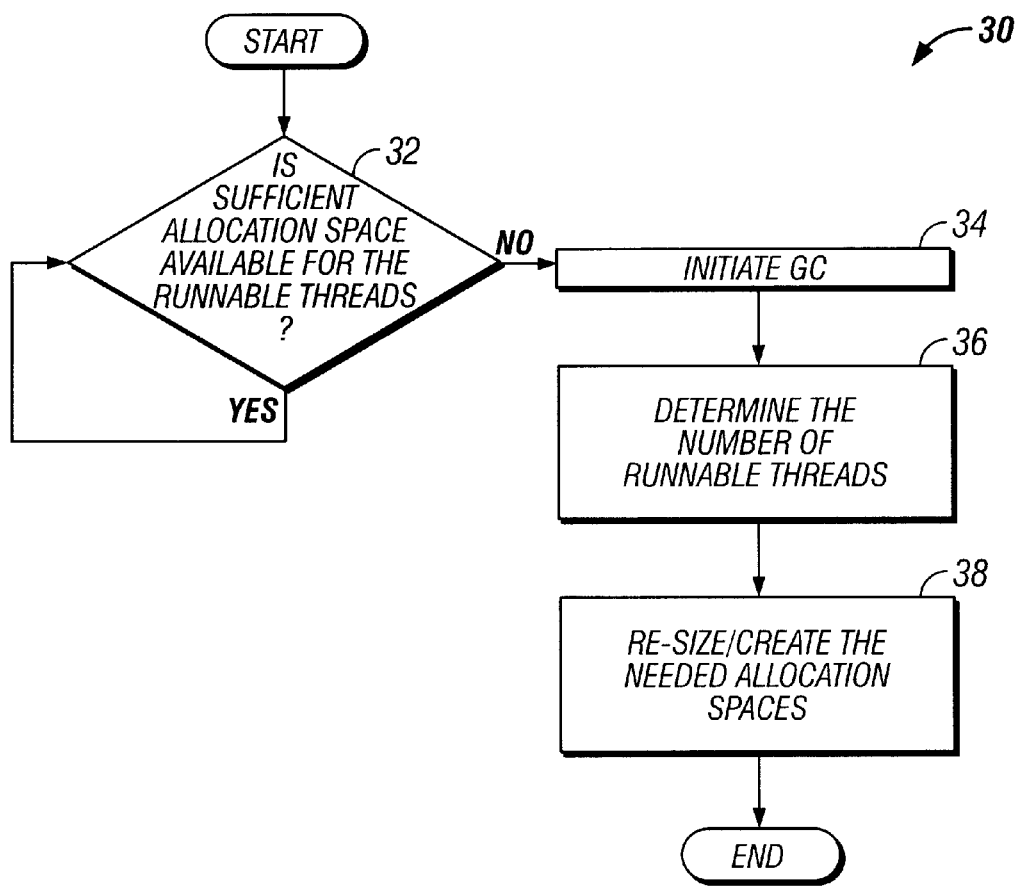
FIG. 2 shows a flow chart representing one embodiment of the "garbage collection" method of the present invention.

FIG. 2 shows a flow chart that represents an example of a garbage collection procedure (step 30) that may be used in an embodiment of the present invention. First, a determination is made as to whether sufficient memory space is available for allocation to all of the runnable threads (step 32). If the space is insufficient, then the garbage collection procedure is initiated (step 34). Next, the number of runnable threads and their respective memory requirements are determined (step 36). Then, heaplets in the memory pool are resized and/or created as needed to meet the demand of the runnable threads (step 38). This procedure for garbage collection may be a mechanism that is run automatically. It is triggered when the machine load drops below a certain threshold due to insufficient allocation space in the pool.

Figure 3:
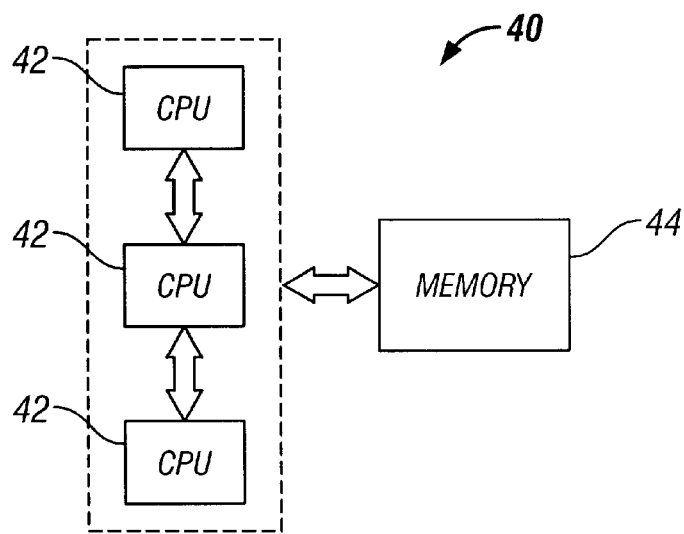
FIG. 3 shows a diagram of a multi-processor environment.

The present invention is intended to be implemented in object-oriented programming languages. Such languages may include, but are not limited to: Java, C++, and Smalltalk. Additionally, the embodiments of the invention have been described for use in multi-processor environments such as network servers. An example of one embodiment of a multiprocessor environment 40 is shown in FIG. 3. This embodiment includes a bank of microprocessors or CPUs 42 which each have access to memory 44. While only three CPUs are shown, any number could be used in configurations that are well known in the art. Additionally, embodiments of the invention could be used to advantage in single processor environments as well.

The advantages of the disclosed invention includes one or more of the following: reduced demands on memory pool allocation space; decreased memory fragmentation; and decreased frequency of garbage collection operations. These advantages result in faster and more stable operations, especially in highly concurrent operations in multi-processor environments.

While the invention has been disclosed with reference to specific examples of embodiments, numerous variations and modifications are possible. Therefore, it is intended that the invention not be limited by the description in the specification, but rather the claims that follows.

What is claimed is:

1. A method for allocating memory comprising:

maintaining a memory pool comprising a plurality of memory spaces;

allocating a memory space to a thread when the thread transitions to a runnable state; and allocating the memory space to the memory pool when the thread transitions to a blocked state; and transitioning the thread to said blocked state when the plurality of memory spaces is insufficient to allocate to the thread; and transitioning the thread to the runnable state when the plurality of memory spaces is sufficient to allocate to the thread.

2. The method of claim 1, further comprising:

determining whether the plurality of memory spaces is sufficient to allocate to a plurality of threads in the runnable state; and resizing at least one of the plurality of memory spaces.

3. The method of claim 1, further comprising:

determining whether the plurality of memory spaces is sufficient to allocate to a plurality of threads in the runnable state; and creating at least one additional memory space.

4. The method of claim 1 wherein the method is implemented in an object-oriented programming language.

5. The method of claim 4 wherein the object-oriented programming language is Java.

6. An apparatus for allocating memory comprising:

a microprocessor; and a program executable on the microprocessor that maintains a memory pool comprising a plurality of memory spaces, allocates a memory space to a thread when the thread transitions to a runnable state, and allocates the memory space to the memory pool when the thread transitions to a blocked state;

transitions the thread to said blocked state when the plurality of memory spaces is insufficient to allocate to the thread; and transitions the thread to the runnable state when the plurality of memory spares is sufficient to allocate to the thread.

7. The apparatus of claim 6 wherein the program further:

determines whether the plurality of memory spaces is sufficient to allocate to a plurality of threads in the runnable state; and resizes at least one of the plurality of memory spaces.

8. The apparatus of claim 6 wherein the program further:
   determines whether the plurality of memory spaces is sufficient to allocate to a plurality of threads in the runnable state; and
   creates at least one additional memory space.

9. The apparatus of claim 6 wherein the program is implemented in an object-oriented programming language.

10. The apparatus of claim 9 wherein the object-oriented programming language is Java.

11. The apparatus of claim 6 further comprising:
   a plurality of microprocessors, wherein the program is executable on any one of the microprocessors.

12. The apparatus of claim 6 wherein the apparatus is a network server.

13. An apparatus for allocating memory comprising:
   means for maintaining a plurality of memory spaces;
   means for allocating a memory space to a thread when the thread transitions to a runnable state; and
   means for de-allocating the memory space to the thread when the thread transitions to a blocked state;
   means for transitioning the thread to said blocked state when the plurality of memory spaces is insufficient to allocate to the thread; and
   means for transitioning the thread to said runnable state when the plurality of memory spaces is sufficient to allocate to the thread.

* * * * *